United States Patent
Chu et al.

(10) Patent No.: US 9,094,806 B2
(45) Date of Patent: *Jul. 28, 2015

(54) MMS SYSTEM TO SUPPORT MESSAGE BASED APPLICATIONS

(75) Inventors: Chun Sheng Chu, Xi'an (CN); Ling Jin, Beijing (CN); Jun Shen, Beijing (CN); Pei Sun, Beijing (CN); Dong Hai Zhai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,364

(22) Filed: Sep. 12, 2012

(65) Prior Publication Data

US 2013/0005346 A1    Jan. 3, 2013

Related U.S. Application Data

(62) Division of application No. 11/644,242, filed on Dec. 22, 2006, now Pat. No. 8,874,147.

(30) Foreign Application Priority Data

Dec. 23, 2005    (CN) .......................... 2005 1 0135086

(51) Int. Cl.
*H04W 4/12* (2009.01)
*H04W 4/14* (2009.01)
(Continued)

(52) U.S. Cl.
CPC . *H04W 4/12* (2013.01); *A45F 4/06* (2013.01); *A47C 7/386* (2013.01); *A47C 31/11* (2013.01); *A47G 9/062* (2013.01); *H04W 4/14* (2013.01); *A45F 3/02* (2013.01)

(58) Field of Classification Search
CPC ...... G06F 17/2235; H04W 4/12; H04W 4/14; H04W 72/02
USPC .................................................. 455/450, 466
See application file for complete search history.

(56) References Cited

U.S. PATENT DOCUMENTS 6,909,904 B2    6/2005    Lehto
7,333,822 B2    2/2008    Laumen
(Continued)

FOREIGN PATENT DOCUMENTS

JP    1102-5011 A    * 1/1999 .............. G06F 12/00
JP    11025011    1/1999
(Continued)

OTHER PUBLICATIONS

TS.23.040, 3GPP, Dec. 2005, vol. 6.6.0, http://www.3gpp.org/ftp/Specs/archive/23_series/23.040/23040.660.zip, Dec. 6, 2005.

*Primary Examiner* — George Eng
*Assistant Examiner* — Jing Gao
(74) *Attorney, Agent, or Firm* — Janice Kwon; Anne Vachon Dougherty

(57) ABSTRACT

Sending apparatus, receiving apparatus, sending method, receiving method and sending and receiving system for supporting application based MMS. The body of an incremental MMS includes a dynamic data section of MMS, a static data indicator associated with the MMS, and a link tag between indicated static data and the dynamic data. The amount of the message quantity transmitted may be reduced because the changed section of the incremental MMS is sent directly via short message channel in dynamic data mode. In turn, the incremental MMS may be sent via short message channel instead of MMS channel due to the reduction of transmitted message, which further reduces the communication cost.

9 Claims, 6 Drawing Sheets

(51) Int. Cl.
*A45F 4/06* (2006.01)
*A47C 7/62* (2006.01)
*A47C 31/11* (2006.01)
*A47G 9/06* (2006.01)
*A45F 3/02* (2006.01)

(56) References Cited

U.S. PATENT DOCUMENTS

| | | | |
|---|---|---|---|
| 7,877,103 | B2 | 1/2011 | Graham |
| 7,995,517 | B2 | 8/2011 | Jin |
| 2002/0177455 | A1 * | 11/2002 | Lehto et al. ............ 455/466 |
| 2003/0109269 | A1 | 6/2003 | Laumen |
| 2004/0185883 | A1 | 9/2004 | Rukman |
| 2005/0039136 | A1 | 2/2005 | Othmer |
| 2005/0075093 | A1 | 4/2005 | Lei |
| 2005/0120305 | A1 | 6/2005 | Engstrom |
| 2005/0154996 | A1 | 7/2005 | Othmer |
| 2005/0191996 | A1 | 9/2005 | Cha |
| 2006/0156218 | A1 * | 7/2006 | Lee ............................ 715/500.1 |

FOREIGN PATENT DOCUMENTS

| | | | |
|---|---|---|---|
| JP | 2005115839 | 4/2005 | |
| KR | 20050045779 | 5/2005 | |
| KR | 20050088706 | 9/2005 | |
| WO | WO 2004/068880 A1 * | 8/2004 | ............ H04Q 7/24 |

* cited by examiner ns, Wireless Application Protocol (WAP)
MMS SYSTEM TO SUPPORT MESSAGE BASED APPLICATIONS This is a divisional application based on parent application U.S. Ser. No. 11/644,242 filed on Dec. 22, 2006.

TECHNICAL FIELD

The present invention relates in general to communication technology. Specifically, the present invention relates to an apparatus, method and system of sending and receiving for supporting application based MMS.

BACKGROUND OF THE INVENTION

Multimedia Message Service (MMS) is a new global message communication standard established by two industrial standard organizations, Wireless Application Protocol (WAP) Forum and 3GPP (3G Partnership Project). The advantage of MMS is to support multimedia functionality, which allows MMS, including text, image, video, animation, audio etc. to be transmitted. MMS has greatly improved the information capability compared with the short message, has enriched the user's experience. MMS is and will be a new profit increase point for network operation providers and service providers.

Designed running on the layer above WAP protocol, MMS does not depend on any concrete network platform, and can be provided by any network platform supporting WAP protocol. Thus, MMS can support HSCSD (High Speed Circuit Switched Data), GPRS (General Packet Radio Service), GSM EDGE (Enhanced Data rata for GSM Evolution, and UMTS (Universal Mobile Telecommunication Systems), and this running platform-independent feature can greatly protect the investment of operators.

FIG. 1 simply shows the message structure of MMS, wherein MMS includes MMS head and MMS body. The MMS head includes the information on how to send the MMS from source to target, such as source address, object address, etc. The MMS body includes a plurality of sections, such as media object, presentation section, etc. with media object including image, text, audio, and selectable presentation section, with each object occupying an individual section, while the presentation section includes the instructions of how to provide multimedia content.

There is a plurality of types of computer presentation languages in the prior arts to show the presentation. A presentation language often used by those skilled in the art is SMIL (Synchronized Multimedia Integration Language). Proposed by W3C in June, 1998 and designed specially for stream multimedia, SMIL is based on the XML, and arranges audio, media, text, and image in sequence by arranging the time sequence. SMIL is often used to deploy a multimedia message presentation language, and is an important method to integrate multimedia to Web content, in which XML language can be used for the timing of a multimedia presentation, to link super link and media object, and to define the screen layout. SMIL is recognized as the method for enriching current message transfer technology based on text. SMIL language comprises a set of modules, and defines semantic information and syntax for a particular function area, such as layout module, timing module, synchronization module and cartoon module.

It is known from the above MMS body structure that the MMS is defined as a kind of message to be delivered to user using text, picture, video, etc. With the popularization of MMS, a lot of content providers communicate with their users by encapsulating their applications into MMS, such as an application of advertisement delivery service based on MMS, a chat room based on MMS, etc. But an important issue for these applications is that there is no communication syntax information to describe the relationship among MMSs. For example, when a supermarket would like to deliver discount information to customers, all the messages must be packaged into one package. If the discount information changes a little, all the information, including changed information and unchanged information, must be re-packaged and re-delivered by the MMS system, since it is not possible for the MMS system to only deliver changed information, which leads to too much information being delivered repeatedly and too much message flux in the network reducing the efficiency of MMS system.

Meanwhile, WAP-Push technology is used in MMS, which is similar to the storing and delivering function for short messages. Thus, the current MMS technology is essentially a technology of first storing then delivering, which means that when an MMS is sent by a sender, it is not received by the receiver directly, but is received by the MMS center of the network of the sender first, then the MMS center sends a notification to notify the receiver to download the message.

For many current MMS applications developed by service providers, the efficiency of this sending and receiving mechanism of WAP-push technology based MMS is very low. The detailed illustration will be given below based on FIG. 2.

FIG. 2 simply shows the current MMS sending and receiving implementing system without roaming, here only the components which lead to low efficiency of MMS application system and relate to the MMS sending and receiving are listed. Other components, such as MMS gateway, providing communication interface for MMS center 202 and back-end application server, are not listed. In FIG. 2, the sender is an application 228, and the receiver is a client device 216 comprising WAP protocol stack 220, short message sender and receiver 222, Message Display 224 and Message storage 226. Application 228 sends the MMS to the MMS Client Receiver 216 via MMS sender 200 and Radio Transmitting Tower 214. FIG. 3 will illustrate the current MMS sending and receiving process in detail. In MMS sender 200, the components related to MMS sending and receiving comprise: MMS center 202, Short Message (SM) Center 210, and wireless WAP gateway associated to MMS center 202. Here the MMS center 202 is the core unit for MMS processing among all components in MMS sender 200, which not only provides support for MMS storage and operation but also provides flexible addressing capability. MMS center 202 comprises MMS server 204 for processing MMS, Notification Short Message Service (SMS) sender 206 and MMS storage.

FIG. 3 illustrates the existing process wherein application 228 sends the MMS and MMS client 216 receives MMS. In FIG. 3, the application prepares an MMS for sending in step S301; application 228 sends the MMS to MMS center 202 in step S303; MMS center 202 receivers the MMS, transforms it into MIME format and then stores it into MMS storage 208 in step S305. Steps S301, S303 and S305 hereinbefore are the preparing work for sending an MMS, they are called preparing steps for sending an MMS, hereinafter. Then MMS center 202 prepares to send the MMS to MMS client Receiver 216 using WAP-push, that is, it notifies SMS center 210 to send a notification SMS in step S307 and the SMS center sends a notification SMS in step S309, In this way, a process for sending an MMS is implemented. Next is the process for MMS client receiver 216 to receive an MMS. MMS client receiver 216 receives a notification SMS in step S311, and builds a WAP connection to send a request including the MMS storage address URL to the MMS center 202 for acquiring the MMS via WAP gateway 212 in step S313. The MMS center 202 sends the MMS to MMS client receiver 216 via the same connection in step S315. The MMS client receiver acknowledges success of receiving via the same WAP connection in step S317, after which the MMS center 202 notifies the sender application 228 that the MMS has been received in step S319. The MMS center 202 apprises the sender application 228 that the MMS has been sent, and the sender application 228 client displays "Message has been sent". In this way, an MMS receiving process for MMS client receiver 216 has been implemented. For the convenience of later description, the combination of steps S313, S315, S317 and S319 are called the steps to receiving ordinary MMS.

It can be seen from the above MMS sending implementing process, that MMS center 202 does not send an MMS to MMS client receiver 216 directly, but sends a notification SMS to notify MMS client receiver 216 that an MMS is waiting for it. Unless the MMS is delivered to MMS client receiver 216 via WAP connection finally, the user does not know what MMS will be received. When the user sets up the MMS client receiver 216 as "pick-up immediately", the MMS client receiver 216 will pick up MMS by itself, and then notify the sender "Message has been received."

It is noted that the MMS receiving process is very complex, especially when the message size is small. The communication delay is correspondingly large.

In summary, there are two major reasons underlying the low efficiency of a current MMS system: too much information is sent repeatedly, which leads to a great deal of message flux on the one hand, and notification messages require additional communications on the other hand.

SUMMARY OF INVENTION

In order to solve the above two problems, one of the objectives of the present invention is to describe the changed part of an MMS solely by utilizing a new MMS description format. Due to only sending the changed part of an MMS, the communication quantity is reduced and the network resources are less burdened. Further, because the size of the changed part of an MMS is small, the MMS can be sent via an SMS channel to further improve the efficiency of the MMS system.

With the invention, the MMS transmitting speed is improved, the real time response of MMS is increased, and users' experiences are improved in the precondition of not changing the current MMS running model. Besides, due to sending small size MMS via the SMS channel, the user's cost is reduced, and it makes it easy for MMS to be accepted. Further, the user's number of MMS service providers will be increased, as well as the service quality and service income by using this invention.

According to one aspect of the invention, there is provided a client receiving apparatus supporting application based MMS for processing the MMS sent by an application, comprising a WAP stack, a short message sender/receiver, a message display, and a message storage, characterized in further comprising: an MMS parser for determining whether the MMS is an incremental MMS or an ordinary MMS, wherein the body of the incremental MMS includes a dynamic data section of the MMS, a static data indicator associated with the MMS, and a link tag between the indicated static data and the dynamic data; and a message merger for merging the incremental MMS into an ordinary MMS according to the link tag.

According to another aspect of the invention, there is provided a client processing method for supporting application based MMS comprising the steps of: determining whether an MMS to be processed is an incremental MMS or an ordinary MMS, wherein the body of the incremental MMS includes a dynamic data section of MMS, a static data indicator associated with the MMS, and a link tag between the indicated static data and the dynamic data; and merging the incremental MMS into an ordinary MMS according to the link tag.

According to a further aspect of the invention, there is provided a sending apparatus for supporting application based MMS comprising an MMS server, an MMS storage, a WAP gateway, a notification short message sender and a short message center, characterized in further comprising: a determining means for determining whether the sending MMS is an incremental MMS or an ordinary MMS, wherein the body of the incremental MMS includes a dynamic data section of the MMS, a static data indicator associated with the MMS and a link tag between the indicated static data and the dynamic data; and a sending channel selector for selecting a sending channel on the basis of the size of the incremental MMS to be sent, which selects a short message channel to send the MMS if the size of the incremental MMS is less than a predefined threshold.

According to a still further aspect of the invention, there is provided a sending method for supporting application based MMS comprising the steps of: determining whether an MMS to be sent is an incremental MMS or an ordinary MMS, wherein the body of the incremental MMS includes a dynamic data section of the MMS, a static data indicator associated with the MMS, and a link tag between indicated static data and the dynamic data; acquiring the size of the incremental MMS to be sent; and sending the MMS via a short message channel if the size of the incremental MMS is less than a predefined threshold.

According to yet a further aspect of the invention, there is provided a sending and receiving system for supporting application based MMS comprising: a sending apparatus, comprising an MMS server, an MMS storage, a WAP gateway, a notification short message sender, and a short message center, the sending apparatus sending an incremental MMS to a client receiving apparatus, wherein the body of the incremental MMS includes a dynamic data section of the MMS, a static data indicator associated with the MMS, and a link tag between the indicated static data and the dynamic data; a client receiving apparatus for processing an MMS sent to it, comprising a WAP stack, a short message sender/receiver, a message display, and further comprising: an MMS parser for determining whether the MMS is an incremental MMS or an ordinary MMS; and a message merger for merging the incremental MMS into an ordinary MMS according to the link tag.

According to an even further aspect of the invention, there is provided a sending and receiving method for supporting application based MMS comprising the steps of: sending an incremental MMS, wherein the body of the incremental MMS includes a dynamic data section of MMS, a static data indicator associated with the MMS, and a link tag between the indicated static data and the dynamic data; receiving the incremental MMS in response to the sending of the incremental MMS; determining whether the MMS to be sent is an incremental MMS or an ordinary MMS; and merging the incremental MMS into an ordinary MMS according to a link tag.

According to a further aspect of the invention, there is provided a program product, comprises program code for implementing the above method; and a medium for storing the program code.

BRIEF DESCRIPTION OF THE DRAWINGS

The new unique features of this invention are described in the claims. However, it will be better to understand the invention, its preferred embodiments, its objective and advantages taking in conjunction the following embodiments with the accompanying drawings in which:

DETAILED DESCRIPTION OF THE INVENTION

Preferred embodiments of the present invention will be described below in more detail with reference to the accompanying drawings. It should be understood that the following specific details enable those skilled in the art to implement the present invention. However, it is apparent for those skilled in the art to make various changes and modifications of the present invention, and the proposed principle in this invention can be applied to other embodiments. Thus the present invention is not limited to the following detailed preferred embodiments.

For an MMS application, there exists a lot of information being exchanged between users and back-end servers. Therefore it is possible to add a kind of incremental update mechanism into an MMS package to reduce communication flux. As used in this specification, an MMS using the existing MMS description mode is referred to as ordinary MMS, while an MMS using the MMS description mode proposed by the invention is referred to as incremental MMS.

Figure 4:
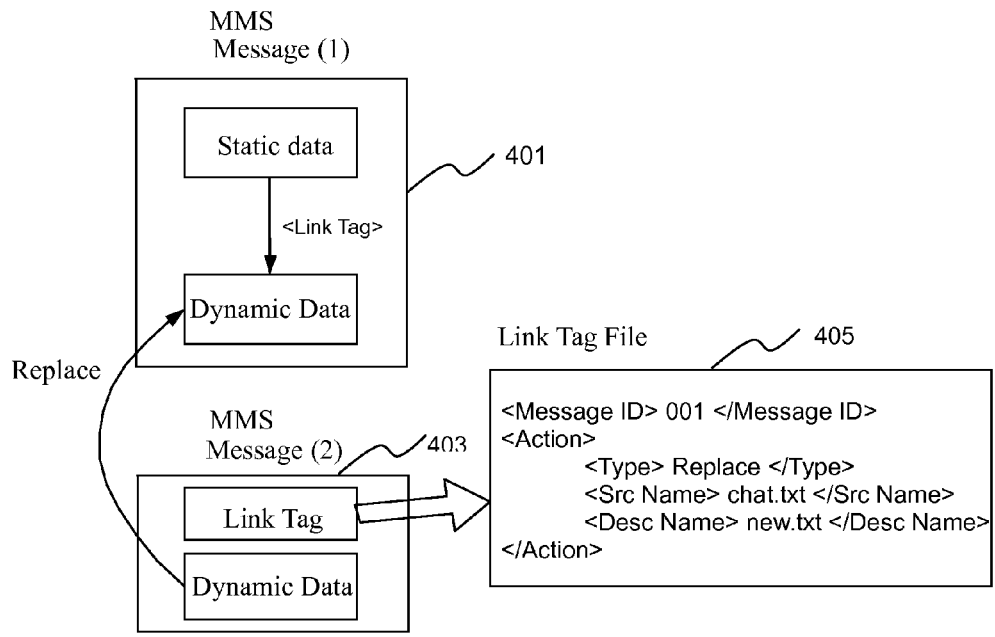
FIG. 4 illustrates a description method for an incremental MMS according to the present invention.

Now refer to FIG. 4, which illustrates a description method for an incremental MMS which proposes an incremental update mechanism. Tag 401 in FIG. 4 shows an incremental MMS in which the body of the MMS is divided into a static data section and a dynamic data section. The static data, serves as the base for later correlative communication between the user and the server, comprises an ordinary MMS object, such as text, picture, audio, etc., and is used to describe the data which is changed less frequently when the user communicates with the server. For example, for an MMS chat application, the background of the chat room can be treated as static data. While the dynamic data is used to describe the data which is changed more frequently when the user communicates with the server, for example, for the above MMS chat application, the chat content can be treated as dynamic data. The combination of the static data and the dynamic data, which imply the relationship between them, provides the content of the whole MMS, and is itself one kind of relationship description. Tag 403 in FIG. 4 shows another incremental MMS which only comprises dynamic data. In this embodiment, a static data indicator associated with the MMS dynamic data is included for indicating the location or source of the static data, its source, etc. Besides, a link tag is also included which describes how to merge the static data and the dynamic data into a new MMS, for example, how to combine the dynamic data with an originally sent static data into a new MMS. Sending this kind of MMS reduces the size of the MMS body data greatly, and reduces the communication flux as well.

The above two embodiments show two description formats of an incremental MMS, however, the description format of the incremental MMS is not limited by the above two description formats. If the message body comprises MMS dynamic data, MMS static data indicator associated with the dynamic data and a link tag between the static data and the dynamic data, the message is a kind of incremental MMS.

The link tag of an incremental MMS describes how to merge the dynamic data and the static data indicated by the static data indicator of the incremental MMS into a new ordinary MMS. A file is used to define the link tag in the preferred embodiment, in which the file is a kind of description file using various formats comprising, but not limited to, XML file, text file, etc. As a preferred embodiment, tag 405 in FIG. 4 shows the XML file of a link tag used by the MMS tagged as 403, which indicates that new.txt in MMS tagged as 403 is used to replace chat.txt file in message tagged as 001 so that a new MMS is generated. To facilitate processing, it is usual to number the message, and then the static data indicator associated with the MMS can use the message number of the MMS that originally exists in the static data, or use a part of message indicated by the message number of the MMS. Actually, static data itself can be regarded as a kind of static data indicator. So the static data indicator of an incremental MMS can be one of followings: message number, a part a message indicated by message number, and static data itself. After applying the description method of an incremental MMS shown in FIG. 4, the communication flux will be reduced greatly by using the MMS with message body comprising solely incremental dynamic data compared with using existing ordinary MMS.

After applying an incremental MMS description, an MMS can be sent via the primary MMS channel; besides, the MMS with small message body size can be sent via the short message channel. Since MMS is a message which is obtained by an MMS client by WAP push after the client is notified by a notification short message, the format of the notification short message is applied to send the MMS data without sending a first notification short message in order to facilitate the MMS client processing of the MMS. However, just due to the specific format of an original notification short message, the MMS client can recognize the notification short message. In order to recognize the new short message format of MMS too, the format of the notification short message needs to be modified a little. Next, the MMS sent via the short message channel will follow the format of a short message which is identified as an MMS. The objective can be obtained by format coding.

Figure 1:
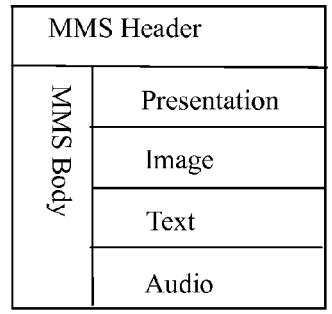
FIG. 1 illustrates a message structure of an ordinary MMS.
Figure 5:
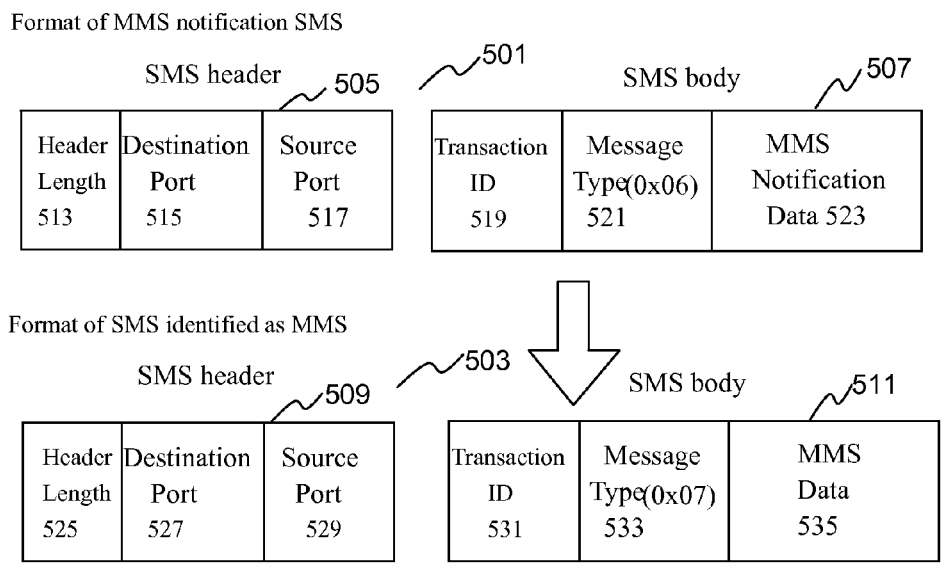
FIG. 5 illustrates a short message format identified as an MMS according to the present invention in which the MMS is sent via SMS channel with MMS notification SMS format.

Refer to FIG. 5, which illustrates a short message format identified as an MMS according to the present invention in which the MMS is sent via short message channel with MMS notification short message format. It is known that an MMS comprises a message head and a message body according to FIG. 1. The message head of an MMS comprises the information on how to send this MMS from a source to an object, for example, source address, object address, etc. The format of a notification short message has been defined in the prior art, as shown in tag 501 in FIG. 5. The format comprises a short message header 505, a short message body 507, the short message header 505 comprising a header length 513, a destination port 515, a source port 517; and the short message body 507 comprising a transaction ID 519, a message type 521, and MMS notification data 523, in which the message type of notification short message identified as MMS is defined as 0x06. Short message 503 identified as an MMS utilizes the similar format with the one of the MMS notification short message, including SMS header 509 and SMS body 511. SMS header 509 comprises header length 525, destination port 527 and source port 529; SMS body 511 comprises transaction ID 531, message type 533 and MMS data 535, in which the message type of short message identified as MMS is defined as other data, supposed 0x07 here. Those skilled in the art will recognize that the proposed format of a short message identified as an MMS in this invention disclosure can be amended in various ways in the scope of standard of short message transmission. All these amendments are within the protected scope of this invention. In this preferred embodiment, the message type is used to distinguish the MMS notification short message from the short message identified as an MMS, and MMS notification data 523 is shown in notification short message, while MMS data 535 is shown in short message identified as an MMS.

Figure 2:
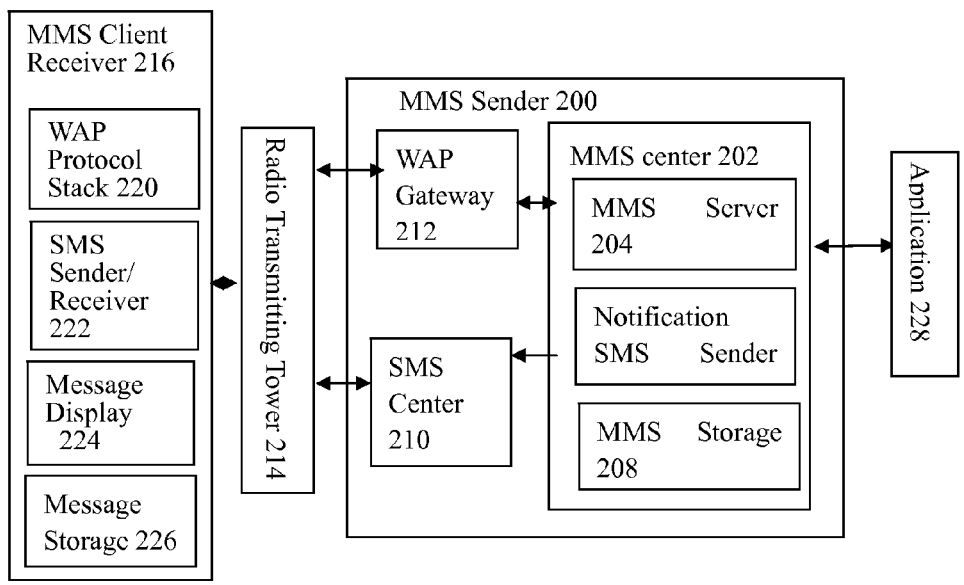
FIG. 2 illustrates an existing sending and receiving system for application based MMS.
Figure 6:
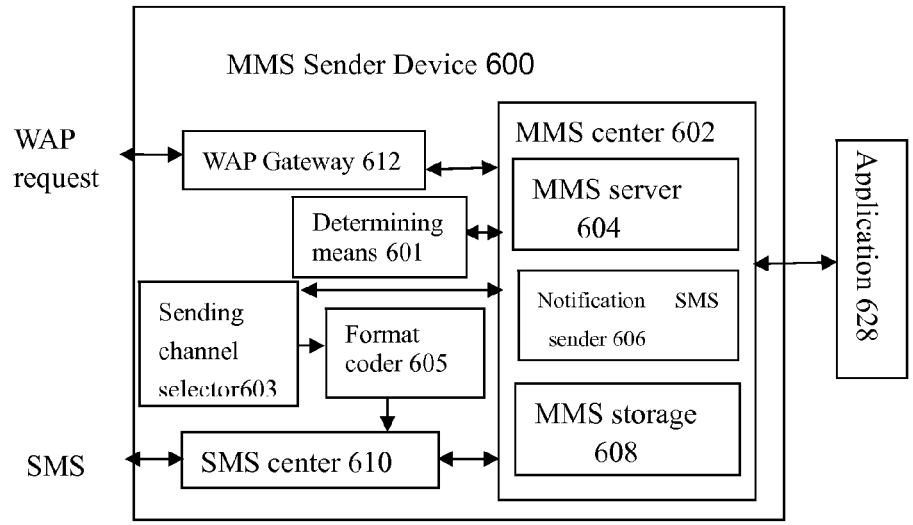
FIG. 6 illustrates a sender device for supporting application based MMS according to the present invention.

Refer to FIG. 6, which illustrates a sender device for supporting application based MMS according to the present invention. The MMS sender device 600 comprises the apparatuses of current MMS sender device shown in FIG. 2, e.g. a MMS center 602, which comprises MMS storage 608, notification SMS sender 606, MMS server 604, and WAP gateway 612, SMS center 610, et al. Besides, the MMS sender device 600 also comprises determining means 610 for determining whether the sending MMS is an ordinary MMS or an incremental MMS. For an ordinary MMS, the message is sent using the technology of the prior art; while for an incremental MMS, some apparatuses proposed in this invention will be used. For example a sending channel selector 603 is used for obtaining the message size of the incremental MMS, then determining the relationship between the message size of the sending MMS and a set threshold. If the message size is larger than the threshold, the message is sent using the technology of the prior art. The set threshold is related to the maximum communication amount/capacity for one time. The short message identified as an MMS is a single MMS in this situation, e.g., the short message itself is an integrated MMS, and there is no need to combine the MMS with other short messages. Single MMS is defined here, because if the message size of the MMS to be sent is larger than the above set threshold, the MMS can be divided into a plurality of short messages identified as an MMS in definite situation. The detailed process will be introduced in the following steps.

In a preferred embodiment, the MMS sender device further comprises a format coder 605 for coding the format of a short message identified as an MMS which is sent via a short message channel. Due to the specific format of MMS, a special short message format is needed when the short message is sent with a short message format. This short message format has been defined in FIG. 5, which is used by the format coder 605 to code the format of MMS data.

In another preferred embodiment, when the message size is larger than the above set threshold, the sending channel selector 603 may notify the MMS center 602 to send the MMS via the MMS channel, e.g., to send the notification short message of the MMS. The incremental MMS may also be decomposed into a plurality of short messages to be sent via the short message channel. In this case, the short message is indicated as a non-single MMS; i.e., the short message itself represents a non-integrated MMS and needs to be combined with other short messages to form an integrated MMS, in which each non-single short message needs to be identified. It should be appreciated by those skilled in the art that various identifying methods can be used, for example, adding a header in the MMS data 535. Whether to send MMS by decomposing the MMS into a plurality of short messages or to send the MMS using existing MMS technology depends on the concrete application, as well as the message fee for a short message and for an MMS. Users can select the above methods according to their preference. Concretely, the sending channel selector 603 can decompose an incremental MMS into a plurality of short messages identified as an MMS, and then format coder 605 sends them after format coding.

The functions of above determining means 601, sending channel selector 603 and format coder 605 are implemented by such apparatus as a CPU, an I/O interface, etc., and these physical apparatus are not restricted to being located within the MMS center 602; rather, they could be placed outside the MMS center 602.

Figure 3:
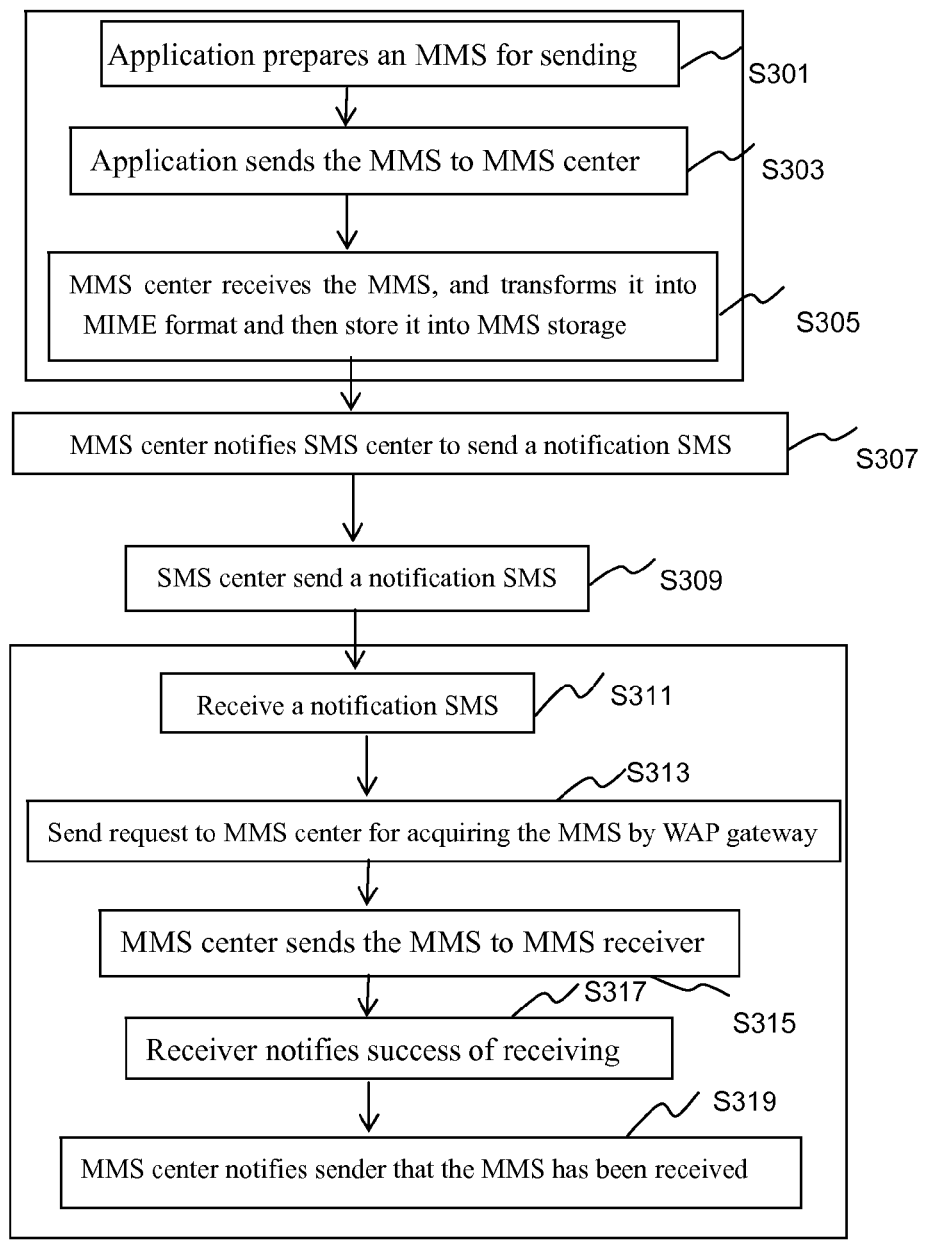
FIG. 3 illustrates a current process in which application sends MMS and client receives MMS.
Figure 7:
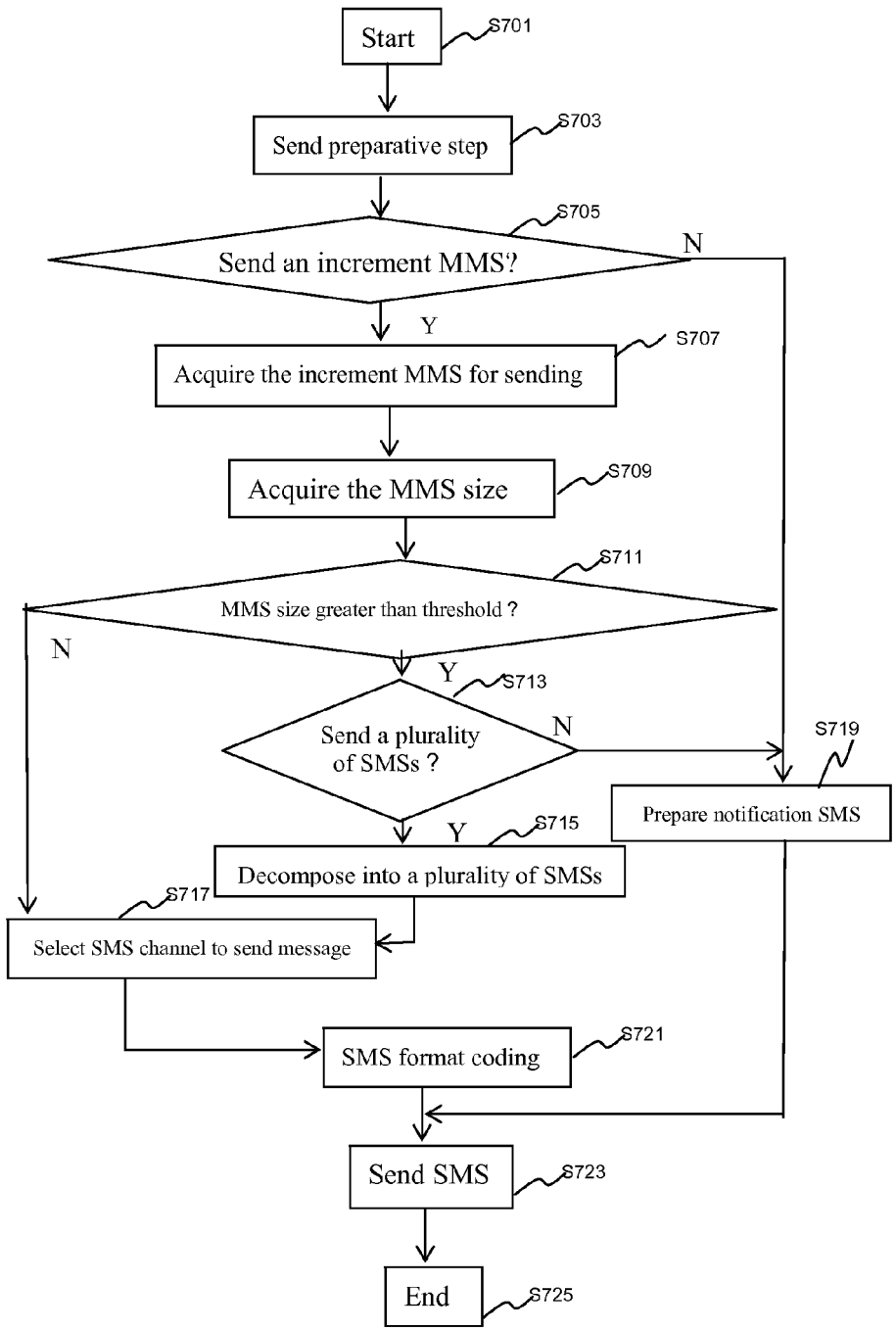
FIG. 7 illustrates a process of sending method for supporting application based MMS according to the present invention.

Refer to FIG. 7, which illustrates a process of a sending method for supporting application based MMS according to the present invention. In this method, the sending process start at step S701; sending preparation is made in step S703, which has been defined in the corresponding description in FIG. 3. It is determined whether the sending message is an ordinary MMS or an incremental MMS in step S705. For the ordinary MMS, a notification short message is prepared in step S719; then the short message is sent in step S723. For an incremental MMS, first the incremental MMS is transmitted to the sending channel selector 603 from the MMS center 602, e.g. incremental MMS is acquired in step S707: Then in step S709, the sending channel selector 603 determines the size of the MMS to be sent. It is would be obvious for those skilled in the art to know how to acquire the message size, and it is not limited to a specific method since there are many methods to do that. Next, the sending channel selector 603 judges whether the MMS size is larger than the threshold previously set in step S711. If the MMS size is equal to or less than the threshold, the process proceeds to step S717 to select a short message channel for sending the message; if the MMS size is larger than the threshold, the further judgment will be done in step S713 to judge whether a plurality of short messages should be sent as the MMS. If suitable, the sending incremental MMS is decomposed into a plurality of short messages in step S715 and then short message channel is selected to send these short messages in step S717. If it is not suitable for the MMS to decompose a plurality of short messages, the process will turn to step S719 to prepare a notification short message to send, and then in step S723, send the notification short message. If the message is sent only by using the short message channel, step S721 will be used to, and a coding short message format for the incremental MMS will be needed. Next, the short message is sent in step S723. In step 725, the sending process is ended. Therefore, it can be seen from the above description that, the message finally sent by the short message sending device is a short message, which can be an ordinary short message, a short message identified as an MMS or an MMS notification short message.

Figure 8:
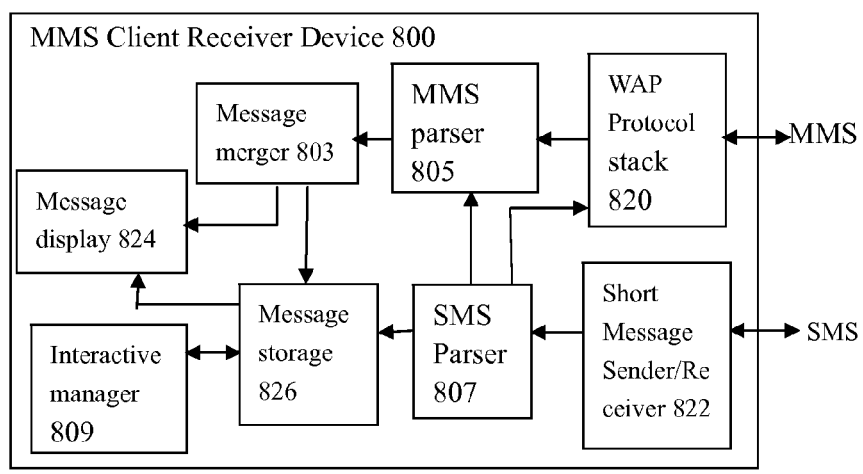
FIG. 8 illustrates a client receiver device for supporting application based MMS according to the present invention.

Refer to FIG. 8, which illustrates a client receiver device for supporting application based MMS according to the present invention. And the device could be a multi-media mobile device including, but not limited to, multi-media mobile phone, PDA, etc. The MMS client receiver device 800 may process an incremental MMS. Apart from a WAP protocol stack 820, a short message sender/receiver 822, a message display 824 and a message storage 826 as in prior art, the MMS client receiver device 800 also comprises an MMS parser 805 for determining whether the MMS is an incremental MMS or an ordinary MMS, and a message merger 803 for merging the incremental MMS into an ordinary MMS according to the link tag. Methods for determining whether the MMS is an incremental MMS or ordinary MMS by the MMS parser 805 are intended to include all such methods rather than limited to a specific one.

The message merger 803 for merging the incremental MMS into an ordinary MMS preferably includes: an alternative link merger for merging an incremental MMS into an ordinary MMS according to dynamic data, static data and a link tag between them; a static data storage for storing the static data; and a determining unit for determining whether the static indicator of an incremental MMS comprises static data. If static data is included, the message merger 803 further includes static data storage for storing the static data. If static data is not included, the message merger 803 further includes an acquiring unit for acquiring the static data of the MMS on the basis of the static indicator. If static data is not included, the message merger 803 further includes an intact message determining unit for determining whether an incremental MMS comprising static data is an intact MMS; and if the incremental MMS is not an intact MMS, the message merger 803 further includes an intact message acquiring unit for acquiring other message data related to the incremental MMS which is not an intact MMS, for determining whether an intact MMS is acquired and for continuing to wait for acquiring the intact MMS until the intact MMS is acquired. All above apparatuses are not shown in FIG. 8; however, those skilled in the art will know that all those apparatuses can be implemented in the form of a processor, a micro-processor, a DSP and a special circuit. Thus, the whole message merger 803 can be implemented by such apparatuses as CPUs, I/O interfaces, etc.

Alternatively, the MMS client receiver device 800 shown in FIG. 8 further includes a short message parser 807, which acquires a short message from a short message sender/receiver 822, and parses the content of the message to determine whether the received message is a message identified as an MMS, a notification short message of an MMS, or an ordinary short message by distinguishing the message type. For a short message identified as an MMS, the SMS parser 807 changes the short message format into MMS format, and then transmits the message to the message merger 803. For an ordinary short message, the message display 824 displays the message whereas for a short message of MMS notification, the message is sent to message display 824 and, meanwhile, the WAP protocol stack 820 obtains the MMS. The short message parser 807 may be implemented by such apparatuses as CPUs, I/O interfaces, etc.

Alternatively, the MMS client receiver device 800 shown in FIG. 8 further includes an interaction manager 809 for managing interactions between the application and the MMS client receiver device 800, and provides user query and search interface, etc. The interaction manager 809 may be implemented by such apparatuses as CPUs, I/O interfaces, etc.

Figure 9:
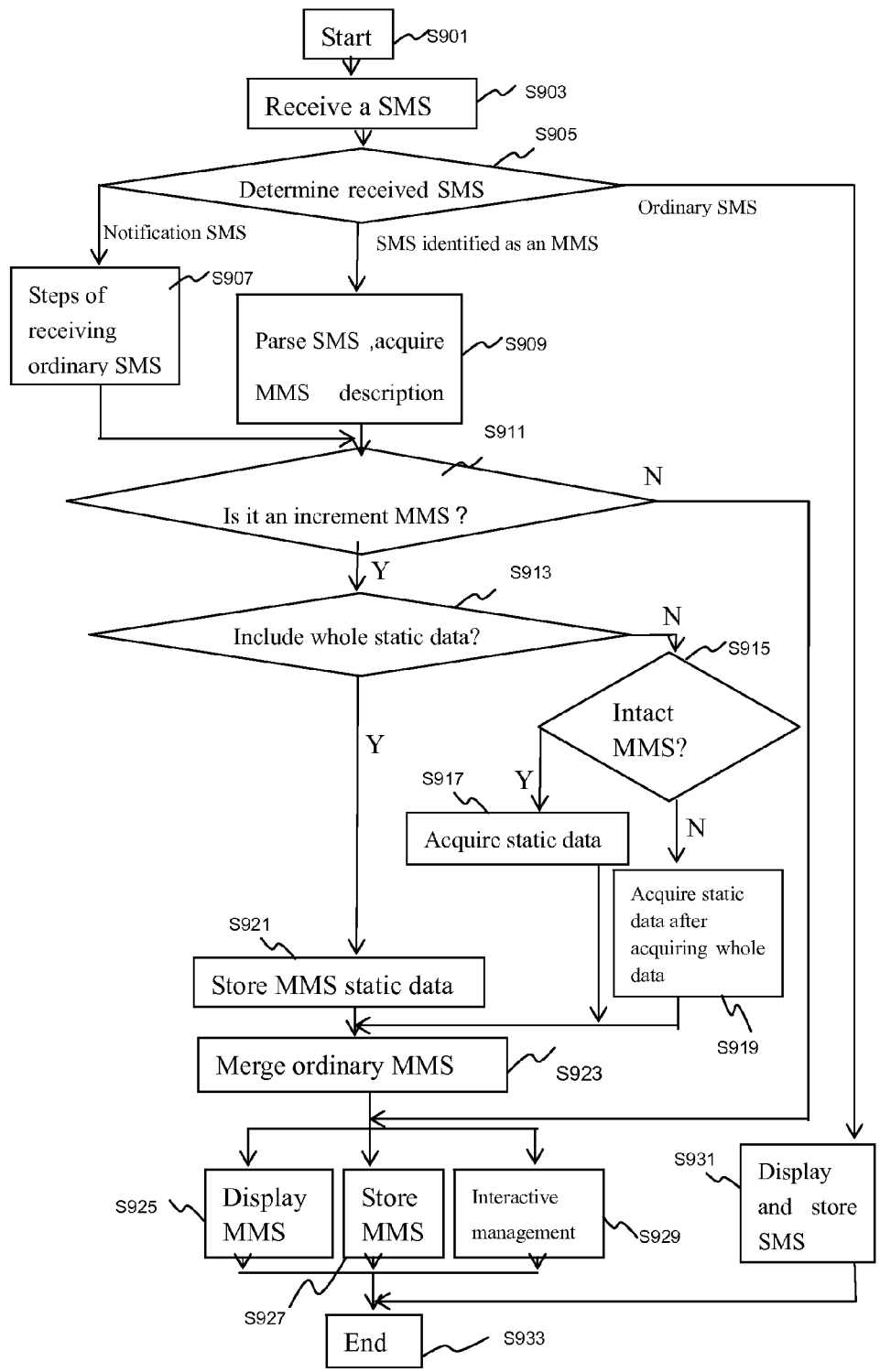
FIG. 9 illustrates a process of receiving method for supporting application based MMS according to the present invention.

Refer to FIG. 9, which illustrates a receiving method for supporting application based MMS according to the present invention. In this method, the receiving process is initialized in step S901, a short message is received in step S903 and in step 905, it is determined whether the received message is a short message identified as an MMS, a notification short message for an MMS, or an ordinary short message. For an ordinary short message, the short message is displayed and stored in step S931, and then the process ends. For a notification short message for an MMS, the MMS client receiver device 800 acquires the MMS on the basis of the URL information indicated by the notification short message through a WAP connection in step S907, that is, the steps for receiving an ordinary MMS defined in FIG. 3, but the MMS here is either an ordinary MMS, or an incremental MMS. For a short message identified as an MMS, the short message identified as an MMS is parsed in step S909 to acquire the description format of the MMS, which comprises the description formats of both incremental MMS and ordinary MMS. Thus the content of the received MMS is obtained. However, the content description format can be either the description format of an ordinary MMS or of an incremental MMS. In order to further utilize existing MMS client technology for an ordinary MMS display, storage and etc., it is determined whether the MMS is an ordinary MMS or an incremental MMS in step 911. For the ordinary MMS, only the MMS is displayed and stored using existing technology, including displaying the MMS in step S925, storing the MMS in step S927 and managing dialog in steps S929. For an incremental MMS, the static indicator of the incremental MMS is checked to determine whether it includes static data in step S913. If static data is included, the static data is stored which will serve as the basis for a later message exchange and the incremental MMS is merged into an ordinary MMS according to dynamic data, static data and a link tag between them in step S923. If the static data is not included, it is determined whether the incremental MMS it is an intact MMS in step S915, and if so, the static data of the incremental MMS is acquired in step S917, and an incremental MMS is merged into an ordinary MMS according to the dynamic data, the static data and the link tag between them in step S923. If it is not an intact MMS, other message data related to the incremental MMS is acquired, and whether an intact MMS has been acquired is determined. If not, the process will continue waiting for an intact MMS, and if the incremental MMS is an intact MMS, static data of the incremental MMS is acquired, and the incremental MMS is merged into an ordinary MMS according to the dynamic data, the static data and the link tag between them in step S923. For the ordinary MMS after merging, the system and method display and store it using existing technology, including steps of displaying the MMS in step S925, storing the MMS in step S927 and managing dialog in steps S929, at last, a receiving process ends in step S933.

Referring back to FIG. 4, the following will further illustrate the method on the basis of MMS shown in FIG. 4. The MMS client receiver device receives an MMS(1)401, the body of the MMS (1) 401 being divided into two parts: static data part and dynamic data part, wherein the static data part is the basis of the later exchanged dynamic data part. Thus the static part of the MMS(1) 401 is stored first; then a short message identified as an MMS (2) 403 is received. For the short message identified as an MMS 403, the short message is parsed to obtain the MMS (2) 403's MMS message 403 data, the MMS message 403 data include a dynamic data part, a static data indicator and a link tag between indicated static data and the dynamic data. After parsing the link tag, it can be known that the static data indicator is expressed by <Type>Replace</Type>, which means that the static data part of (2) 403 is the same as the MMS (1) 401, and the link tag is expressed by <Type>Replace</Type>, <Src Name>chat.txt</Src Name> and <Desc Name>new.txt</Desc Name>, e.g., file new.txt in MMS (2) 403 is utilized to replace file chat.txt in MMS (1) 401. Here, the static data indicator and the link tag file are put into an XML file 405. Alternatively, the static data indicator and the link tag file can be expressed respectively. After obtaining the static data of MMS (1) 401 by using the above link tag and static data indicator, the file new.txt can be utilized to replace chat.txt in MMS (1) 401 to obtain an MMS. The message can be displayed in the MMS. Here, the description format of MMS including message dynamic data, static data indicator and link tag can be variously changed at the client side without departing from the scope and spirit of the invention.

Combining the MMS sender device for supporting application-based MMS shown in FIG. 6 and the MMS client receiver device for supporting application-based MMS shown in FIG. 8, an MMS sending and receiving system for supporting the application is obtained, the technical character of the sender device in the system is the same as the sender device shown in FIG. 6 and the technical features of the receiver device in the system are the same as the receiver device shown in FIG. 8, thus the detailed description is omitted here.

Combining the sending method for supporting application-based MMS shown in FIG. 7 and the client receiving method for supporting application-based MMS shown in FIG. 9, a sending and receiving method for supporting application-based MMS is obtained, the technical features of the sending method in the method are the same as the sending method shown in FIG. 7 and the technical features of the receiving method in the system are the same as the receiving method shown in FIG. 9, thus the detailed description is omitted here.

The present invention also provides a program product, which comprises the program code implementing ire all of the above methods and medium for storing the program code.

Although the invention has been described in detail with some illustrative embodiments in the above, the invention is not limited to those embodiments. By referring to the invention's specification, it would be apparent for those skilled in the art to make various changes and modifications. Accordingly, various changes and modifications may be affected by those skilled in the art without departing from the spirit and scope of the invention.

The invention claimed is:

1. A sending apparatus for supporting application based Multimedia Messaging Service (MMS) comprising:
an MMS server for generating ordinary and incremental MMS messages and comprising an incremental update component for assembling an incremental MMS message by providing a body of the incremental MMS message including a dynamic data section of the incremental MMS message containing only a changed part from an original MMS message, a static data indicator associated with the incremental MMS message, and a link tag between indicated, non-changed static data from the original MMS and the dynamic data, wherein the link tag describes how to merge the dynamic data from the incremental MMS into the original MMS to replace part of the original MMS according to the dynamic data, the static data indicated by the static data indicator and the link tag, and to thereby generate a new ordinary MMS message;
sending means comprising more than one sending channel:
a determining means for determining whether an MMS message to be sent is an incremental MMS message or an ordinary MMS message, wherein the body of the incremental MMS message includes the dynamic data section of the incremental MMS message containing only the changed part from the original MMS message, the static data indicator associated with the incremental MMS message, and the link tag between the indicated, non-changed static data from the original MMS and the dynamic data;
a size comparison means for determining a size of the incremental MMS message to be sent and for comparing the size to a predefined threshold; and
a sending channel selector for selecting a sending channel on basis of the size of the incremental MMS message to be sent.

2. The sending apparatus as recited in claim 1, further comprising: a format coder for coding MMS format into short message format, when the size of the incremental MMS message is judged to be less than the predefined threshold.

3. The sending apparatus as recited in claim 1, wherein, when the size of the incremental MMS message is bigger than the predefined threshold, said apparatus decomposes the incremental MMS message into a plurality of short messages and sends the plurality of short messages comprising the incremental MMS via a short message channel.

4. A sending method for supporting application based Multimedia Messaging Service (MMS) comprising the steps of:
determining whether an MMS message to be sent is an incremental MMS message or an ordinary MMS message;
based on a determination that an MMS message is to be sent as the incremental MMS message, assembling the MMS message as an incremental MMS message by providing a body of the incremental MMS message including a dynamic data section of the incremental MMS message containing only a changed part from an original MMS message, a static data indicator associated with the incremental MMS message, and a link tag between indicated non-changed static data from the original MMS and the dynamic data, wherein the link tag describes how to merge the dynamic data from the incremental MMS into the original MMS to replace part of the original MMS according to the dynamic data, the static data indicated by the static data indicator and the link tag, and to thereby generate a new ordinary MMS message;
acquiring a size of the incremental MMS message to be sent;
comparing the size of the incremental MMS message to a predefined threshold; and
selecting a sending channel based on the comparing.

5. The sending method as recited in claim 4, wherein the method further comprises the step of coding MMS format into short message format, wherein the incremental MMS message is sent via a short message channel.

6. The sending method as recited in claim 4, wherein the method further comprises one of a step of sending the incremental MMS message via an MMS channel if the size of the incremental MMS message is bigger than the predefined threshold and a step of sending the incremental MMS message via a short message channel when the size of the incremental MMS message is less than or equal to the predefined threshold.

7. The sending method as recited in claim 4, wherein the method further comprises the steps of:
splitting the increment MMS message into a plurality of short messages if the size of the sending incremental MMS message is bigger than the threshold, and
sending the plurality of short messages via short message channel.

8. The sending method as recited in claim 4, wherein the link tag describes how to merge the dynamic data and the static data indicated by the static data indicator into a new ordinary MMS message, the method further comprising forming a new ordinary MMS message by merging the dynamic data and the static data.

9. A non-transitory computer program product comprising program code for implementing a sending method for supporting application based Multimedia Messaging Service (MMS) comprising the steps of:
   determining whether an MMS message to be sent is an incremental MMS message or an ordinary MMS message;
   based on a determination that an MMS message is to be sent as the incremental MMS message, assembling an MMS message as the incremental MMS message by providing a body of the incremental MMS message including a dynamic data section of the incremental MMS message containing only a changed part from an original MMS message, a static data indicator associated with the incremental MMS message, and a link tag between indicated non-changed static data from the original MMS and the dynamic data, wherein the link tag describes how to merge the dynamic data from the incremental MMS into the original MMS to replace part of the original MMS according to the dynamic data, the static data indicated by the static data indicator and the link tag, and to thereby generate a new ordinary MMS message;
   acquiring a size of the incremental MMS message to be sent;
   comparing the size of the incremental MMS message to a predefined threshold; and
   selecting a sending channel based on the comparing.

* * * * *